United States Patent [19]

Gloster

[11] 4,158,043
[45] Jun. 12, 1979

[54] PROCESS FOR PRODUCING SODA ASH FROM NATURAL ALKALI METAL CARBONATE-CONTAINING ORES

[75] Inventor: Arthur Gloster, New York, N.Y.

[73] Assignee: Texasgulf Inc., Stamford, Conn.

[21] Appl. No.: 870,580

[22] Filed: Jan. 18, 1978

[51] Int. Cl.² .............................................. C01D 7/00
[52] U.S. Cl. ............................. 423/206 T; 23/302 T
[58] Field of Search .................. 423/186, 206 T, 421; 23/302 T

[56] References Cited

U.S. PATENT DOCUMENTS 3,653,848  4/1972  Port et al. ......................... 423/206 T Primary Examiner—O. R. Vertiz
Assistant Examiner—Wayne A. Langel

[57] ABSTRACT

Described herein is a process for producing soda ash (sodium carbonate) from natural ores such as trona in which separate soda ash products are produced having differing purities. According to the invention, a substantially purified and saturated solution of sodium carbonate is divided into at least two separate process streams, one of which is subjected to crystallization in the absence of recycled mother liquor to form high purity sodium carbonate-containing crystals, while the other stream is subjected to crystallization in the presence of recycled mother liquor to form lower purity crystals. The crystals are thereafter separately processed to obtain soda ash products of differing grades.

8 Claims, 2 Drawing Figures

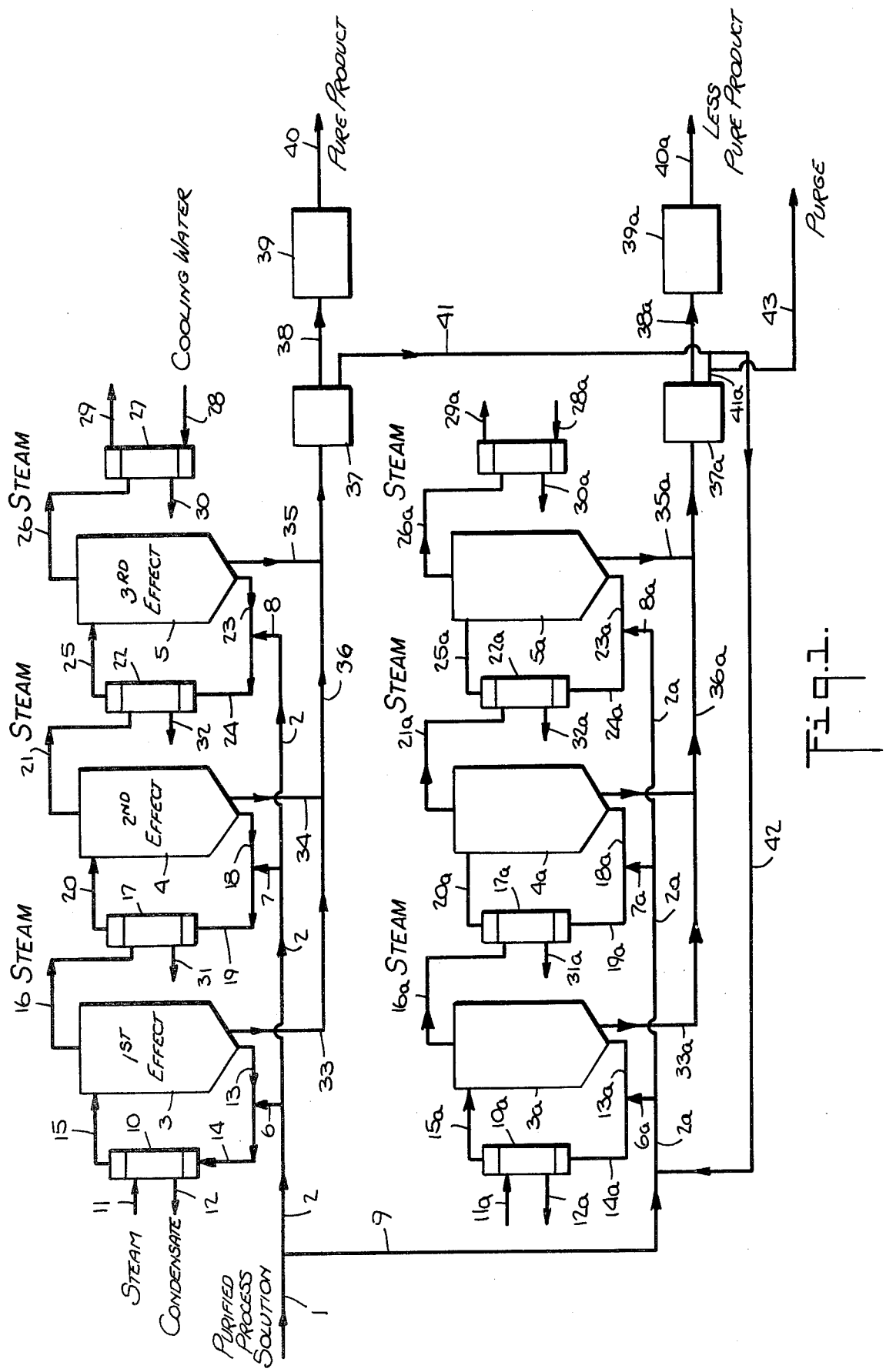

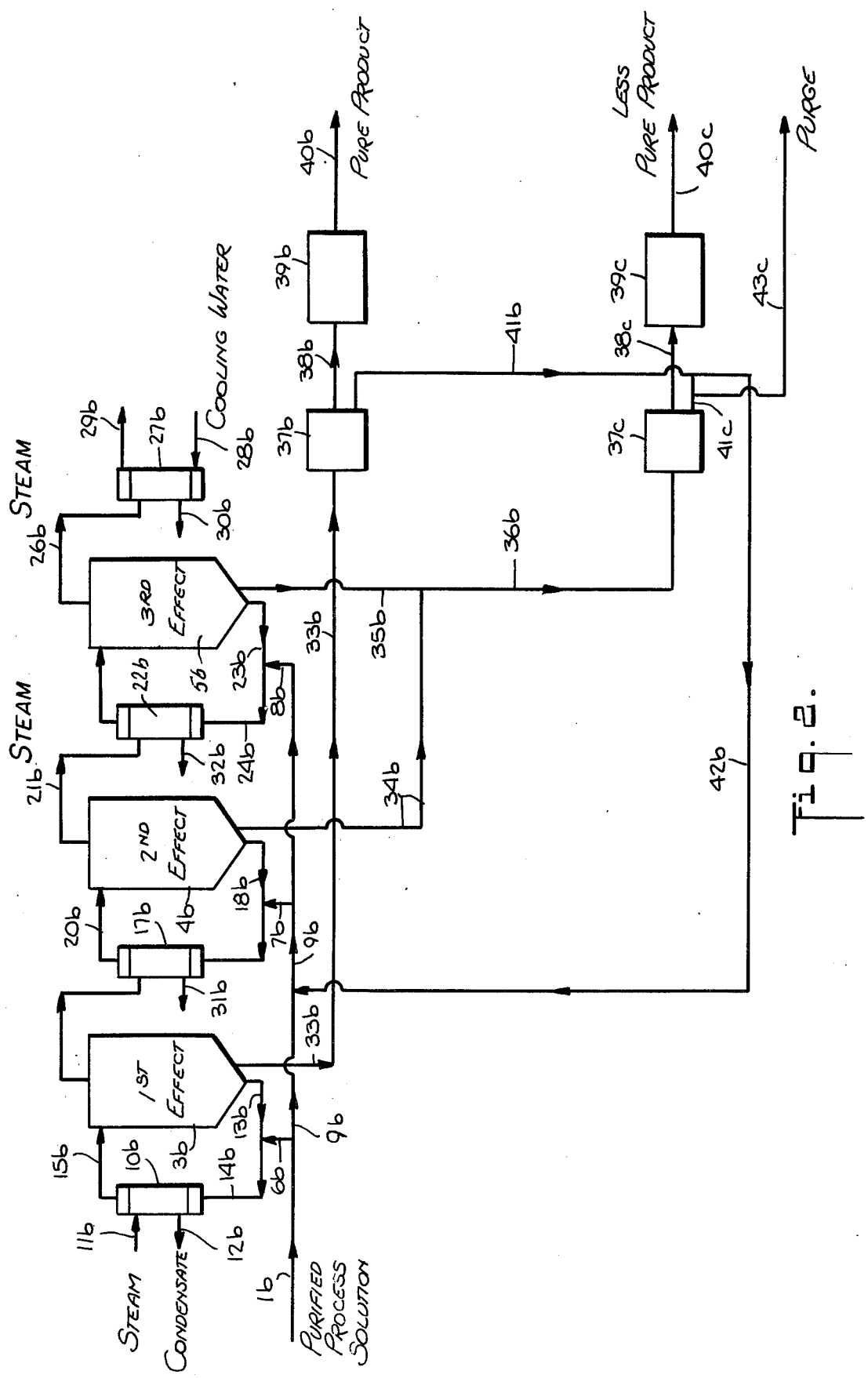

PROCESS FOR PRODUCING SODA ASH FROM NATURAL ALKALI METAL CARBONATE-CONTAINING ORES

BACKGROUND OF THE INVENTION

1. Field of the Invention

This invention relates to the production of sodium carbonate (soda ash) from natural ores such as trona, and more particularly to an improved process for producing two grades of soda ash product, one more pure than the other.

2. Description of the Prior Art

While a considerable quantity of soda ash is produced in accordance with the well-known Solvay process, increasing amounts have of late been produced from natural alkali metal carbonate-containing mineral deposits, primarily located in the Green River Basin of Colorado, Utah and Wyoming. Examples of such minerals are trona, dawsonite and nahcolite. Trona, as mined in the area of Green River, Wyoming contains about 90 to 95 percent sodium sesquicarbonate ($Na_2CO_3 \cdot NaHCO_3 \cdot 5 H_2O$). The remaining s to 10 percent consists mainly of insoluble components (principally shale) plus sodium chloride (NaCl), sodium sulphate ($Na_2SO_4$), and small quantities of organic matter.

In a common method of obtaining marketable soda ash from these minerals such as trona ore, the crude trona is first heated to approximately 150 to 200° C. to decompose the bicarbonate portion of the sesquicarbonate into sodium carbonate carbon dioxide. The resulting crude soda ash is mixed with enough water in a dissolver to produce a substantially saturated solution having about 30 percent $Na_2CO_3$ by weight. The solution is separated from the insoluble impurities, treated with activated carbon to remove a majority of the organic matter, and then usually filtered to yield a purified clear pregnant liquor, but which still contains some organic matter plus dissolved NaCl and $Na_2SO_4$.

The pregnant liquor is then fed into multiple effect evaporative crystallizers (usually three-stage) in which water is evaporated and crystals of sodium carbonate monohydrate ($Na_2CO_3 \cdot H_2O$) are formed. The crystals are separated from the mother liquor and dried to form sodium carbonate. The sodium carbonate solid is screened and the insize fraction is then stored for shipment as final product. Because the mother liquor may contain as much as 30 percent of the sodium carbonate in the original pregnant liquor feed, it is normally recycled to the crystallizers for further treatment.

The basic process outlined above, also known as the monohydrate process, is disclosed in U.S. Pat. No. 2,962,348, issued to L. Seglin et al on Nov. 29, 1960. U.S. Pat. No. 3,933,977, issued to J.M. Ilardi et al on Jan. 20, 1976, provides additional detailed description of equipment and procedures for preparing a pregnant liquor carbonate process solution, and the disclosures of both these patents are expressly incorporated here by reference.

Although recycling the mother liquor greatly improves the yield of sodium carbonate crystals, both the concentration of any residual organic matter which passes through the carbon treaters and soluble impurities, such as NaCl and $Na_2SO_4$, tend to build up in the crystallizers. If the organic matter buildup becomes too high, it can cause foaming in the crystallizers and the sodium carbonate crystals will be discolored and possess undesirably low bulk density. Excessive concentrations of NaCl and $Na_2SO_4$ will result in the formation of complex salts which may crystallize out along with the sodium carbonate to cause off-specification product. Although the foaming effect can be offset to some extent by adding defoaming compounds, the adverse effects on the crystalline product can be prevented only by keeping the concentration of these impurities at a relatively low level.

One proposed solution to this problem is to recycle only a portion of the mother liquor and purge the rest. The previously mentioned Seglin et al U.S. Pat. No. 2,962,348, for example, teaches puring enough mother liquor from the recycling line to operate at a concentration of about 5% combined NaCl and $Na_2SO_4$.

SUMMARY OF THE INVENTION

According to the present invention, both the advantages and disadvantages of recycling mother liquor are uniquely utilized in a process for preparing separate grades of soda ash product. For example, there can be produced a first soda ash product which is low in calcium content and therefore suitable for the manufacture of sodium silicate, and a second soda ash product of suitable density for use in glass manufacture. Similarly, a first soda ash product may be produced which is low in C.O.D. and therefore suitable for detergent manufacture.

In the process of the present invention, a substantially purified and substantially saturated sodium carbonate solution (purified pregnant solution) derived from natural alkali metal carbonate-containing ores is divided into at least two separate process streams. One of the streams is subjected to crystallization to effect the formation of a high grade of sodium carbonate-containing crystals therefrom, while a second stream, together with recycled mother liquor, is subjected to crystallization to effect the formation of a lower grade of sodium carbonate-containing crystals. Thus, a first stream is crystallized in the absence of any recycled mother liquor while a second stream is crystallized in the presence of mother liquor recycled thereto. As will become more apparent hereinafter, this mother liquor recycled to the second stream pregnant solution may be that resulting from the crystallization of either the first or second stream of pregnant solution or a mixture of mother liquor from both crystallizers.

The separately prepared sodium carbonate-containing crystals are thereafter separately processed according to known techniques to produce soda ash products of differing grade or purity. Thus, the crystals are separated from the mother liquor and separately dried and screened for dust removal.

In accordance with one embodiment of the present invention, crystallization of the divided streams of pregnant sodium carbonate solution is effected in separate and distinct multi-effect evaporative crystallizers. Thus, the first process stream is crystallized in a first multi-effect crystallizer employing no recycle of mother liquor to any effect, while the second process stream is passed to a second multi-effect crystallizer wherein recycle is employed.

In an alternative embodiment, crystallization of the divided streams of pregnant solution is accomplished in different effects of a single multi-effect evaporative crystallizer. Thus, the first process stream is passed to, for example, the first effect for crystallization employing no recycled mother liquor, while the second stream is crystallized in the second and third effects employing recycled mother liquor.

BRIEF DESCRIPTION OF THE DRAWINGS

FIG. 1 is a schematic flowsheet of one embodiment of the present invention utilizing two sets of triple-effect crystallizers.

FIG. 2 is a schematic flowsheet of an alternative embodiment utilizing one triple-effect evaporative crystallizer.

DETAILED DESCRIPTION OF THE INVENTION

Referring to FIG. 1, purified pregnant sodium carbonate process solution is delivered to pipeline 1. This solution flows through pipeline 2 and is delivered to each of the three crystallizer bodies, 3, 4, and 5, through pipelines 6, 7, and 8. A second stream of purified solution is delivered to the second set of crystallizers through pipeline 9.

The purified sodium carbonate process solution is prepared, for example, from trona, by any known process, such as those described in U.S. Pat. No. 2,962,348 and No. 3,933,977 discussed earlier. The solution obtained from such processes is substantially saturated with sodium carbonate together with small amounts of organic matter and dissolved salt.

Steam from a boiler (not shown) is fed to the heat exchanger 10, through pipeline 11 and condensate is removed through pipeline 12. The contents of the first effect crystallizer 3 are circulated through the heat exchanger 10 and back to the crystallizer through pipelines 13, 14 and 15. The steam heats the circulating liquor thus causing water to boil out of the liquor and be removed from the crystallizer through pipeline 16. The removal of the water causes the liquor to become supersaturated and, in contact with the crystal magma in the crystallizer body, causes sodium carbonate crystals to form. These crystals may be sodium carbonate monohydrate or anyhydrous sodium carbonate depending on the operating temperature in the crystallizer body.

The steam leaving crystallizer body 3 through pipeline 16 enters heat exchanger 17, through which the contents of the second effect crystallizer 4 are circulated through pipelines 18, 19 and 20. In a manner similar to that which occurs in the first effect crystallizer, this steam heats the circulating liquor in the second effect causing steam to be produced and crystals to be formed. The steam is conveyed through pipeline 21 to the third effect heat exchanger 25 wherein it heats the liquor in third effect crystallizer 5 circulating through the heat exchanger by pipelines 23, 24 and 25 and forms more steam and crystals. The steam is conveyed by pipeline 26 to condenser 27. This condenser may be a barometric or surface condenser; a surface condenser is shown. Cooling water enters the condenser through pipeline 28 and the heated water leaves through pipeline 29. Means (not shown) for producing vacuum and removing air and noncondensable gases are provided. Condensate from the condenser is removed through pipeline 30.

Condensate from the second and third effects of the crystallizer is removed by pipelines 31 and 32. The condensate from the first effect heat exchanger is preferentially returned to the boiler. Condensate from the other two heat exchangers and the condenser, which may contain some sodium carbonate because of carryover from the crystallizers, may be used as process water to dissolve the impure soda ash resulting from the calcination of trona.

Crystals from each effect are removed by pipelines 33, 34 and 35 and conveyed by pipeline 36 to the means 37 for separating the crystals from the mother liquor, which may be a centrifuge or filter. The crystals thus separated are conveyed by chute or conveyor 38 to product dryer 39, which may be a direct gas or oil fired dryer or a steam tube type dryer. The pure product leaves the dryer by chute or conveyor 40 and is conveyed to storage (not shown).

Because of evaporation of water in the crystallizers, the mother liquor becomes concentrated in impurities. As a feature of this invention the mother liquor is not returned to the crystallizers described above. It is conveyed through pipeline 41, combined with mother liquor from the other separating means 37a and fed to the second set of crystallizers which will produce the less pure product.

The second stream of purified pregnant solution, which, in operation, is the remainder of the purified process solution in excess of the quantity needed in the crystallizers described above, is fed through pipeline 9 into pipeline 2a where it is combined with recycled mother liquor conveyed through pipeline 42 and also entering pipeline 2a. The combined liquor is fed to crystallizers 3a, 4a and 5a via pipelines 6a, 7a and 8a. The flow through crystallizers 3a, 4a and 5a are the same as described for 3, 4, and 5, and will not be repeated herein. All pipelines, etc. which are similar for both sets have been assigned the same numbers, using the letter "a" to designate those used to produce the less pure product.

The crystals produced in crystallizers 3a, 4a and 5a will be produced from mother liquor containing more impurities than that in crystallizers 3, 4 and 5 and the crystals will be of somewhat lower purity. Also, it may be desirable to add crystal habit modifiers (not shown) to the feed to crystallizers 3a, 4a, and 5a in order to increase the product density. This can be done without affecting the quality of the crystals from crystallizers 3, 4, and 5, because the mother liquor is not returned to these.

The less pure crystals are withdrawn from crystallizers 3a, 4a, and 5a through pipelines 33a, 34a, and 35a and are conveyed to separating means 37a through pipeline 36a. The solid crystals are fed to product dryer 39a through chute or conveyor 38a. The less pure product is conveyed to storage (not shown) by means of conveyer 40a. The mother liquor leaving separating means 37a is conveyed by pipelines 41a and 42 to pipeline 2 where it is combined with a stream of purified process solution.

The purge from the system is removed through pipeline 43 or from some other convenient point.

FIG. 2 is a schematic flowsheet of an alternate embodiment of the process of the invention. This shows one set of triple-effect crystallizers, two means of separating the crystals from the mother liquor and two product dryers. In this alternate embodiment, the pure product is produced in the first effect and the less pure product is produced in the second and third effects.

Referring to FIG. 2, purified pregnant sodium carbonate process solution is delivered to pipeline 1b. This solution is fed to the first effect crystallizer body 3b through pipeline 6b. The excess of purified solution is delivered by crystallizer bodies 4b and 5b through pipelines 7b, 8b, and 9b. The recycled mother liquor from pipeline 42c is comingled with the purified solution in pipeline 9b before it is fed to the crystallizers 4b and 5b.

The purified sodium carbonate process solution is prepared as previously described and contains similar impurities.

Steam from a boiler (not shown) is fed to heat exchanger 10b through pipeline 11b and condensate is removed through pipeline 12b. The contents of the first effect crystallizer 3b are circulated through the heat exchanger 10b and back to the crystallizer through pipelines 13b, 14b, and 15b. The steam heats the circulating liquor thus causing water to boil out of the liquor and be removed from the crystallizer through pipeline 16b. The removal of the water causes the liquor to become super-saturated and, in contact with the crystal magma in the crystallizer body, causes sodium carbonate crystals to form. As described previously these may be either sodium carbonate monohydrate or anyhydrous sodium carbonate depending on the operating temperature.

The crystals produced in the first effect 3b are withdrawn through pipeline 33b and fed to separating means 37b. The crystals thus separated are conveyed by chute or conveyor 38b to product dryer 39b. The pure product leaves the dryer by conveyor 40b and is transported to storage (not shown).

The mother liquor separated in 37b has more impurities than does the purified pregnant process solution. For this reason it is not returned to the first effect evaporator 3b. It is conveyed through pipeline 41b, combined with mother liquor from the other separating means 37c and fed to the second and third crystallizer stages 4b and 5b which are used to produce a less pure product.

Feed to the second and third effects 4b and 5b is the combined flow of recycled mother liquor from the pure product means of separation 37b, recycled mother liquor from the less pure product means of separation 37c, combined in pipeline 42c and mixed with the excess of purified process solution, not needed in the first effect crystallizer, in pipeline 9b and fed into the crystallizer through pipelines 7b and 8b.

The steam leaving the first effect crystallizer 3b through pipeline 16b enters heat exchanger 17b through which the contents of the second effect crystallizer 4b are circulated by means of pipelines 18b, 19b, and 20b. In a manner similar to that which occurs in the first effect crystallizer this steam heats the circulating liquor in the second effect causing steam to be produced and crystals to be formed. The steam is conveyed through pipeline 21b to the third effect heat exchanger 22b wherein it heats the liquor circulating through the heat exchanger by pipelines 23b, 24b and 25b and forms more steam and crystals. The steam is conveyed by pipeline 26b to condenser 27b. Cooling water enters the condenser through pipeline 28b and the heated water leaves through pipeline 29b. Means (not shown) for producing vacuum and removing noncondensable gases are provided. Condensate is removed through pipeline 30b.

Condensate from the heat exchangers in the second and third effects is withdrawn through pipelines 31b and 32b.

Crystals are withdrawn from the second and third effects 4b and 5b through pipelines 34b and 35b and are conveyed to separating means 37c through pipeline 36b. After separation, the crystals are conveyed to product dryer 39c through chute or conveyor 38c. The less pure product is conveyed to storage (not shown) by means of conveyor 40c. The mother liquor leaving separating means 37c through pipeline 41c is combined with that in pipeline 41b and conveyed in pipeline 42c which causes it to join with the excess of purified process solution in pipeline 9b and to be recycled to the second and third effect crystallizers 4b and 5b.

The purge from the system is removed through pipeline 43c.

Although the foregoing description makes reference to specific preferred embodiments and operating parameters, it will be appreciated that they are intended to be exemplary rather than limiting. It is evident that various modifications and changes may be made without departing from the scope and spirit of this invention as defined in the appended claims.

What is claimed is:

1. In a process for the production of soda ash wherein a substantially purified and saturated solution of sodium carbonate derived from an alkali metal carbonate-containing mineral is subjected to crystallization to effect formation of sodium carbonate-containing crystals, the improvement comprising:
    (a) dividing said saturated solution of sodium carbonate into at least first and second separate streams;
    (b) effecting crystallization of sodium carbonate-containing crystals from said first stream in the complete absence of recycled mother liquor;
    (c) effecting crystallization of sodium carbonate-containing crystals from said second stream in the presence of recycled mother liquor;
    (d) separately processing said crystals from each of said first and second streams to produce soda ash products of differing purity.

2. The process according to claim 1 wherein crystallization of said first and second streams is effected in separate and distinct multiple-effect crystallizers.

3. The process according to claim 1 wherein crystallization of said first and second streams is effected in separate effects of a single multi-effect crystallizer.

4. The process according to claim 1 wherein said alkali metal carbonate-containing mineral comprises trona.

5. A process for producing soda ash comprising the steps of:
    (a) subdividing an alkali metal carbonate-containing ore;
    (b) decarbonating said ore by heating to expel carbon dioxide and water to form impure sodium carbonate;
    (c) dissolving said impure sodium carbonate to form a substantially saturated solution thereof;
    (d) substantially removing impurities from said solution;
    (e) dividing said purified solution into separate first and second streams;
    (f) effecting, in the complete absence of mother liquor recycled to said separate first stream, crystallization of a first quantity of sodium carbonate-containing crystals in a mother liquor from said first stream;
    (g) separating said crystals from said mother liquor and further processing said crystals to obtain a first soda ash product;
    (h) effecting crystallization of a second quantity of sodium carbonate-containing crystals in a mother liquor from said second stream, said crystals being produced in the presence of mother liquor recycled to said second stream;

(i) separating said second crystals from mother liquor, and further processing said second crystals to obtain a second soda ash product differing in purity from that of said first soda ash product.

6. The process according to claim 5 wherein said alkali metal carbonate-containing ore is trona.

7. The process according to claim 5 wherein crystallization of said first and second streams is effected in separate and distinct multi-effect crystallizers.

8. The process according to claim 5 wherein crystallization of said first and second streams is effected in separate effects of a multi-effect crystallizer.

* * * * *

UNITED STATES PATENT AND TRADEMARK OFFICE
CERTIFICATE OF CORRECTION

PATENT NO. : 4,158,043
DATED : 6/12/79
INVENTOR(S) : Arthur Gloster

It is certified that error appears in the above—identified patent and that said Letters Patent are hereby corrected as shown below:

Col. 1, line 23, change "5" to --2--.

Col. 1, line 23, change "s" to --5--.

Col. 1, line 25, change "1" to --1-- (small "L")

Col. 3, line 50, change "25" to --22--.

Signed and Sealed this

Fourth Day of September 1979

[SEAL]

Attest:

LUTRELLE F. PARKER

Attesting Officer    Acting Commissioner of Patents and Trademarks